United States Patent Office 2,998,415
Patented Aug. 29, 1961

2,998,415
PREPARATION OF RESINOUS MATERIALS FROM UNSATURATED ETHERS AND HETEROCYCLIC COMPOUNDS
Edward M. Geiser, Downers Grove, Ill., assignor, by mesne assignments, to Universal Oil Products Company, Des Plaines, Ill., a corporation of Delaware
No Drawing. Filed Dec. 15, 1955, Ser. No. 553,202
14 Claims. (Cl. 260—91.1)

This application is a continuation-in-part of my copending application Serial No. 466,209, filed November 1, 1954, now abandoned.

This invention relates to new compositions of matter and particularly to high molecular weight resinous compositions which are prepared by copolymerizing an unsaturated ether containing at least one ethylenic bond with a heterocyclic compound.

It is an object of this invention to prepare a resinous material which may be used to produce hard surface coatings.

A more particular object of this invention is to effect the copolymerization of an unsaturated ether and a heterocyclic compound to prepare high molecular weight resinous compositions which may be used as protective coatings or in manufacturing molded objects.

One embodiment of this invention is found in a process for the preparation of a resinous material by condensing an unsaturated ether containing at least one ethylenic bond with a heterocyclic compound containing from two to three carbon atoms in the ring at a temperature in the range of from about −50° to about +100° C. to effect multiple condensations between said unsaturated ether and said heterocyclic compound, and recovering the resultant resinous material.

Another embodiment of the invention resides in a process for preparing a resinous material by condensing an unsaturated ether containing at least one ethylenic bond with a heterocyclic compound containing from two to three carbon atoms in the range of from about −50° to about +100° C. in the presence of a catalyst comprising a metal halide-etherate complex to effect multiple condensations between said unsaturated ether and said heterocyclic compound, and recovering the resultant resinous material.

A specific object of the embodiment resides in a process for preparing a resinous material which comprises condensing methyl vinyl ether and ethylene imine at a temperature in the range of from about 0° to about +20° C. to effect multiple condensations between said methyl vinyl ether and said ethylene imine, and recovering the resultant resinous material.

Yet another specific embodiment of the invention is found in a process for the preparation of a resinous material which comprises condensing methyl vinyl ether and ethylene imine at a temperature in the range of from about 0° to about +50° C. in the presence of a catalyst comprising a boron trifluoride-ethyl ether complex to effect multiple condensations between said methyl vinyl ether and said ethylene imine, and recovering the resultant resinous material.

Other objects and embodiments referring to alternative unsaturated ethers and to alternative heterocyclic compounds will be set forth in the following further detailed description of the invention.

It has now been discovered that new compositions of matter in the form of resinous materials may be obtained by copolymerizing and unsaturated ether containing at least one ethylenic bond with a heterocyclic compound containing from two to three carbon atoms in the ring. The compounds prepared according to the process of this invention are suitable for a wide variety of uses, said uses including among other things hard surface coatings, as compounds which may be formed into molded objects or products, or as intermediates in the preparation of other plastic materials.

Heterocyclic compounds containing from two to three carbon atoms, and not more than a total of four atoms, including the hetero atom, in the ring, which may be used in the process of this invention include ethylene imine, ethylene epoxide, ethylene episulfide, 1,2-propylene imine, 1,2-propylene epoxide, 1,2-propylene episulfide, 1,3-propylene imine, 1,3-propylene epoxide, 1,3-propylene episulfide, etc.

The unsaturated ethers which are copolymerizable with the aforementioned heterocyclic compounds include unsaturated ethers such as divinyl ether, diallyl ether, methyl vinyl ether, ethyl vinyl ether, propyl vinyl ether, methyl allyl ether, ethyl allyl ether, propyl allyl ether, butyl allyl ether, etc., alkyl-substituted unsaturated ethers such as α-methyldivinyl ether, α-ethyl divinyl ether, α,α'-dimethyldivinyl ether, α,α'-diethyldivinyl ether, α-methyldiallyl ether, α-ethyldiallyl ether, α-propyldiallyl ether, α,α'-dimethyldiallyl ether, α,α'-diethyldiallyl ether, α,β-dimethyldiallyl ether, α,β-diethyldially ether, etc.; aryl-substituted unsaturated ethers such as α-phenyldivinyl ether, α-benzyldivinyl ether, α,α'-diphenyldivinyl ether, α,α'-dibenzyldivinyl ether, α-(p-tolyl)divinyl ether, α-(m-tolyl)divinyl ether, α-(o-tolyl)divinyl ether, α-(p-tolyl)diallyl ether, α-(m-tolyl)diallyl ether, α-(o-tolyl)diallyl ether, β-(p-tolyl)diallyl ether, β-(m-tolyl)diallyl ether, β-(o-tolyl)diallyl ether, α,α'-di(p-tolyl)divinyl ether, α,α'-di(m-tolyl)divinyl ether, α,α'-di(o-tolyl)divinyl ether, α,α'-di(p-ditolyl)diallyl ether, α,α'-di(m-ditolyl)diallyl ether, α,α'-di(o-ditolyl)diallyl ether, etc.; hydroxy substituted alkyl-unsaturated ethers such as glycerol-α-vinyl ether, glycerol-α-allyl ether, etc. It is to be understood that the aforementioned compounds are merely examples of the unsaturated ethers containing at least one ethylenic bond which may be used, and that the process of the present invention is not necessarily limited thereto.

The process of the present invention is carried out at reaction conditions which are sufficient to cause the heterocyclic compound containing two to three carbon atoms in the ring to decyclize and to form an olefinic analogue thereof, and, thereafter at the same reaction conditions, to cause multiple condensations of the unsaturated ethers and olefinic analogue of the heterocyclic compound. The aforementioned reaction is usually carried out at a temperature in the range of from about −50° to about +100° C., while generally maintaining the reaction mixture at a pressure sufficient to keep a substantial portion of the mixture in a liquid state.

If so desired, the copolymerization of the unsaturated ether containing at least one ethylenic bond and the heterocyclic compound containing two to three carbon atoms in the ring may be carried out in the presence of a catalyst of the Friedel-Crafts metal halide type, examples of which include aluminum chloride, ferric chloride, bismuth chloride, zinc chloride, etc. For purposes of this invention boron trifluoride is considered as a metal halide falling within the class of the above defined Friedel-Crafts type catalysts. A preferred catalyst in the process of this invention comprises a metal halide-etherate complex such as a boron trifluoride-ethyl ether complex.

When employing relatively active catalysts such as aluminum chloride, ferric chloride, boron trifluoride-ethyl ether complexes etc., lower operating temperatures within the above indicated limits are generally preferred inasmuch as these catalysts have a relatively high activity, particularly in the presence of hydrogen chloride or hydrogen bromide which are sometimes used simultaneously with a metal halide catalyst. When a less active catalyst such as bismuth chloride or zinc chloride is used, somewhat higher temperatures in the range of from about 0° to about +100° C. are preferred.

The process of this invention may be effected in any suitable manner and may comprise either a batch or a continuous type operation. When a batch type operation is used, a quantity of the starting material, namely, the unsaturated ether and the heterocyclic compound along with the catalyst, if one is used, is placed in a suitable reaction vessel such as a rotating autoclave. The vessel is then cooled or heated to the desired temperature range for a predetermined time, satisfactory conditions of time and temperature, as hereinbefore stated, depending upon the reactants and catalyst, if any, which are used. Upon completion, the desired product is separated from the catalyst, if used, and from any unreacted starting materials, and recovered therefrom by conventional means, for example, by fractional distillation, crystallization, etc.

Another method of operation of the present process is of the continuous type. In this method the starting materials comprising the unsaturated ether and the heterocyclic compound are continuously charged to a reactor maintained at suitable operating conditions of temperature and pressure. The reactor may comprise an unpacked vessel or coil or many contain an adsorbent packing material such as alumina, fire brick, dehydrated bauxite and the like. The starting materials may be continuously charged to this reactor through separate means or, if so desired, may be admixed prior to introduction into the reactor and charged thereto in a single stream. Likewise, if the catalyst to be used in this reaction is a solid, as for example, aluminum chloride, it may be placed in the reactor as a solid bed, or if it is in gaseous or liquid form such as the boron trifluoride-ethyl ether complex, it may be charged to the reactor through separate means. After a predetermined residence time has elapsed the copolymerization product is withdrawn and separated from the reactor effluent while the unconverted unsaturated ether and heterocyclic compound may be recycled for further use as a portion of the feed stock. If the more active catalysts such as those hereinbefore enumerated are employed at relatively high operating temperatures in the above indicated range, for example, about +30° to about +100° C. the charge rate of the reaction mixture is maintained at a sufficient space velocity to quickly remove the reaction product from the catalyst zone, thereby avoiding undesirable decomposition reactions. Likewise, when the less active catalysts are used within the lower temperatures of the indicated operating range, the reaction must be prolonged in order to obtain substantial condensation products of the reaction. The reactants may be charged to the reactor at a liquid hourly space velocity (the volume of liquid charge in relation to the solid catalyst in the reaction zone) ranging from about 10 to about 500 depending upon the catalyst and temperatures utilized in the reaction. When using the lower space velocities hereinbefore set forth an inert solvent comprising a high boiling paraffin such as heptane or an aromatic hydrocarbon such as benzene, toluene, etc., is usually present in the reactor. As hereinbefore indicated, the particular temperature which is used for the copolymerization reaction of this invention will depend upon the particular reactants undergoing polymerization as well as the catalyst, if any, which is used.

A particularly suitable type of operation when using a solid metal halide catalyst of the type hereinbefore described comprises a fixed bed type in which the desired catalyst is disposed as a bed in the reaction zone and the reactants are passed therethrough in either an upward or downward flow. When utilizing this process a solvent of the type hereinbefore described will be needed to prevent a pressure build-up due to the tendency of the resinous product to remain on the solid catalyst. Other continuous types of processes, under suitable operating conditions of temperature and pressure, may include a fluidized bed type operation in which the unsaturated ether and heterocyclic compound along with the solid catalyst, are maintained in a state of turbulence under hindered settling conditions in the reaction zone; the compact moving bed type of operation in which the reactants and catalysts pass either concurrently or countercurrently to each other; and the slurry type process in which the catalyst is carried into the reaction zone as a slurry in the heterocyclic compound. In each of the aforementioned types of processes the unreacted materials are separated out and recycled for use as a portion of the feed stock while the desired copolymers are withdrawn and separated from any by-products which may be formed during the reaction.

It is to be understood when using the preferred catalyst of the present invention, that is, a boron fluoride-etherate complex the above enumerated types of processes are not applicable inasmuch as said catalyst is not a solid.

The reactants will be present in the reaction mixture in amounts ranging from a 1:1 ratio of unsaturated ether to heterocyclic compound up to about a 10:1 ratio of unsaturated ether to heterocyclic compound. In addition, the catalyst, if used, is present in an amount ranging from about 0.1 to about 10% by weight of the combined unsaturated ether-heterocyclic compound mixture.

The following examples are given to illustrate the process of this invention which, however, are not intended to limit the generally broad scope of the present invention in strict accordance therewith.

*Example I*

Approximately equal molecular proportions of glycerol-α-allyl ether and ethylene imine were placed in a flask which had previously been cooled to a temperature in the range of from about −40° to about −50° C. A boron trifluoride-ethyl ether complex catalyst in an amount approximately 5% by weight of the combined unsaturated ether and ethylene imine was added to the flask at this temperature. It was noted that no reaction took place until the flask was heated to a temperature in the range of from about 30° to about 50° C., at which point the glycerol-α-allyl ether and ethylene imine copolymerized. The resulting copolymer was separated from unreacted materials, mixed with a conventional metallic drier and spread in a thin film on a glass plate. This film quickly dried to a tack-free surface coating.

*Example II*

Approximately equal molecular proportions of divinyl ether and ethylene imine are placed in a condensation flask. The flask is then heated to a temperature in the range of from about 30° to about 50° C., at which point copolymerization of the divinyl ether and the ethylene imine will occur. This copolymer may then be separated from the unreacted starting material, and when mixed with a metallic drier and spread in a thin film on the desired object will quickly harden to a strong, somewhat brittle surface coating.

*Example III*

Approximately equal molecular proportions of methyl vinyl ether and ethylene imine are placed in a flask similar to that described in the above examples. The flask is then heated to a temperature in the range of from about 30° to about 50° C. at which time the methyl vinyl ether and the ethylene imine copolymerize. The reaction product resulting therefrom is treated in the conventional manner hereinbefore described and will result in a tack-free surface coating.

*Example IV*

Approximately equal molecular proportions of diallyl ether and ethylene imine are placed in a condensation flask. A catalyst, comprising a boron trifluoride-ethyl ether complex amounting to approximately 5% by weight of the combined reactants is added to the flask, after which said flask is heated to a temperature of approximately 40° C. The diallyl ether and ethylene imine copolymerize at approximately this temperature to provide a reaction product which, having been separated from unreacted starting materials and mixed with conventional metallic driers will result in a tack-free surface coating which quickly hardens to provide a brittle surface coating which is resistant to strong caustic.

I claim as my invention:

1. A process for the preparation of a resinous material which comprises condensing an alkylene imine having from 2 to 3 carbon atoms in the ring with an unsaturated either consisting of carbon, hydrogen and oxygen and selected from the group consisting of divinyl ether, diallyl ether, methyl vinyl ether, ethyl vinyl ether, propyl vinyl ether, methyl allyl ether, ethyl allyl ether, propyl allyl ether, butyl allyl ether, lower alkyl-substituted and mononuclear aryl-substituted divinyl and diallyl ethers, glycerol-alpha-vinyl ether and glycerol-alpha-allyl ether at a temperature in the range of from about −50° to about +100° C. and in a ratio of ether to imine of from about 1:1 to about 10:1 to effect multiple condensations between said unsaturated ether and said alkylene imine, and recovering the resultant resinous product.

2. The process of claim 1 further characterized in that said alkylene imine is ethylene imine.

3. The process of claim 1 further characterized in that said alkylene imine is propylene imine.

4. The process of claim 1 further characterized in that said alkylene imine and unsaturated ether are condensed in the presence of a catalyst comprising a boron trifluoride-ethyl ether complex.

5. The process of claim 1 further characterized in that said alkylene imine and unsaturated ether are condensed in the presence of a Friedel-Crafts metal halide catalyst.

6. The resinous condensation product resulting from the process of claim 1.

7. A process for the preparation of a resinous material which comprises condensing divinyl ether with ethylene imine at a temperature in the range of from about −50° to about +100° C. and in a ratio of ether to imine of from about 1:1 to about 10:1 to effect multiple condensations between said divinyl ether and said ethylene imine, and recovering the resultant resinous material.

8. A process for the preparation of a resinous material which comprises condensing diallyl ether with ethylene imine at a temperature in the range of from about −50° to about +100° C. and in a ratio of ether to imine of from about 1:1 to about 10:1 to effect multiple condensations between said diallyl ether and said ethylene imine, and recovering the resultant resinous material.

9. A process for the preparation of a resinous material which comprises condensing methyl vinyl ether with ethylene imine at a temperature in the range of from about −50° to about +100° C. and in a ratio of ether to imine of from about 1:1 to about 10:1 to effect multiple condensations between said methyl vinyl ether and said ethylene imine, and recovering the resultant resinous material.

10. A process for the preparation of a resinous material which comprises condensing divinyl ether with ethylene imine at a temperature in the range of from about −50° to about +100° C. and in a ratio of ether to imine of from about 1:1 to about 10:1 in the presence of a catalyst comprising a boron trifluoride-ethyl ether complex to effect multiple condensations between said divinyl ether and said ethylene imine, and recovering the resultant resinous material.

11. The resinous condensation product resulting from the process of claim 7.

12. The resinous condensation product resulting from the process of claim 8.

13. The resinous condensation product resulting from the process of claim 9.

14. The process of claim 9 further characterized in that said ether and imine are condensed in the presence of a Friedel-Crafts metal halide catalyst.

References Cited in the file of this patent

UNITED STATES PATENTS

| | | |
|---|---|---|
| 2,136,928 | Schlack | Nov. 15, 1938 |
| 2,580,901 | Erickson et al. | Jan. 1, 1952 |
| 2,596,200 | Bestian | May 13, 1952 |
| 2,626,931 | Bestian | Jan. 27, 1953 |
| 2,676,166 | Webers | Apr. 20, 1954 |
| 2,687,404 | Robertson | Aug. 24, 1954 |
| 2,694,696 | Melamed | Nov. 16, 1954 |
| 2,824,857 | Drechsel | Feb. 25, 1958 |